United States Patent Office 2,730,440
Patented Jan. 10, 1956

2,730,440

HERBICIDES

John K. Fincke, San Jose, Calif., assignor to Monsanto Chemical Company, St. Louis, Mo., a corporation of Delaware No Drawing. Application June 20, 1952,
Serial No. 294,712

7 Claims. (Cl. 71—2.7)

The present invention relates to herbicides and deals more particularly with methods for the general destruction of undesired plants.

A number of herbicides are known, a variety of organic and inorganic compounds having been suggested in prior art for use as plant-killers. Many of such prior materials have a selective activity, i. e., when employed in certain concentrations they destroy only certain plants without harming adjacent growth of different species. Hence, such herbicides are not of general usefulness and are of little value in clearing large areas such as railway sidings, parking lots, etc. Among other disadvantages of prior herbicides may be mentioned corrosive effect on equipment, chemical reactivity with other components customarily employed in agricultural sprays or powders, instability when exposed for long periods of time to ordinary atmospheric conditions, and soil instability, e. g., chemical reactivity with soil components and susceptibility to decomposition by soil microorganisms which result in loss of the active material.

Now I have found that highly stable, non-corrosive herbicidal compositions are obtained by employing as the active ingredient a compound selected from the class consisting of aliphatic amines having the formula:

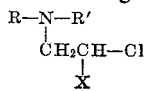

in which R and R' are members of the group consisting of hydrogen, alkyl radicals of from 1 to 8 carbon atoms, the radical —CH$_2$CH$_2$Cl and the radical —CH$_2$CHClCH$_3$, and X is selected from the class consisting of hydrogen and the methyl radical; and hydrochlorides of said amines.

As illustrative of compounds having the above general formula may be mentioned tris (β-chloroethyl)amine, bis(β-chloroethyl)methylamine, β-chloroethyldimethyl- amine, β-chloroethylisopropylmethylamine, di-n-amyl-β-chloroethylamine, di-iso-butyl-β-chloroethylamine, β-chloroethyl-di-n-hexylamine, β-chloroethyl bis(2-ethyl-hexyl)amine, (β-chloro-β-methylethyl)dimethylamine, (β-chloro-β-methylethyl)di-n-octylamine, (β-chloro-β-methylethyl)di-tert.-butylamine, β-chloroethyldimethyl- amine hydrochloride, β-chloroethyldihexylamine hydrochloride, hydrochlorides of bis(β-chloroethyl) alkyl- amines, e. g., bis(β-chloroethyl)ethylamine hydrochloride or bis(β-chloroethyl)amylamine hydrochloride, hydrochlorides of bis(β-chloropropyl)alkylamines, e. g., bis(β-chloropropyl)isopropylamine hydrochloride or bis-(β-chloropropyl)di-n-octylamine hydrochloride, hydrochlorides of β-chloropropyldialkylamines, e. g., β-chloropropyldiisobutylamine hydrochloride or β-chloropropyldi- methylamine hydrochloride, hydrochlorides of amines containing both the chloroethyl radical and the chloropropyl radical, e. g., β-chloroethyl-(β-chloropropyl)-eth- ylamine hydrochloride or β-chloropropyl-bis-(β-chloroethyl)amine hydrochloride, tris-(β-chloroethyl)amine hydrochloride, tris-(β-chloropropyl)amine hydrochloride, etc.

Amines having the above general formula are readily obtainable in known manner by reaction of ethylene oxide or propylene oxide with ammonia or a lower alkylamine to yield a β-hydroxyethyl- or β-hydroxypropyl-amine compound, and subsequent chlorination of the hydroxyamine to give the β-chloroethyl or β-chloropropyl compound. Treatment of the resulting chloroalkylamine with hydrochloric acid yields the hydrochlorides thereof.

The hydrochlorides are generally stable, crystalline salts possessing solubility characteristics which permit easy incorporation into inert carriers for the formulation of herbicidal compositions. While the liquid amines may be incorporated into dusting compositions, the preparation of herbicidal dusts is more easily effected when using the crystalline hydrochlorides.

Herbicidal compositions containing the present amines or hydrochlorides thereof are readily obtained by first preparing a solution of the amine compound in an organic solvent and then adding the resulting solution to water containing an emulsifying agent to form an emulsion. Because of the very high herbicidal efficiency of the present amine compounds they are present in the herbicidal composition in only very small concentrations, for example, in concentrations of from 0.1 per cent to 2 per cent by weight of the total weight of the emulsion. Emulsifying agents which may be employed are those customarily used in the art for the preparation of oil-in-water emulsions. The word "oil" is here used to designate any organic liquid which is insoluble in water. Since the present amine compounds are highly stable materials of little chemical reactivity, they are not affected by either ionic or nonionic emulsifying agents. Examples of emulsifying agents which may be used include alkyl- benzenesulfonates, long chained polyalkylene glycols, long chained succinates, etc. The emulsions may be used to destroy already existing plant growth by direct application to the undesirable plants, e. g., by spraying; or the emulsions may be employed to prevent plant growth by application to media which normally support plant growth. When employed to prevent plant growth, for example in parking areas, highway abutments, railway yards, etc., the emulsions may be applied by spraying only the surface of said media or they may be admixed with said media. Generally, spraying of only the soil surface is sufficient to prevent plant growth in areas which are to be kept clear of plants. However, the emulsions may be incorporated into customarily employed temporary surfacing materials, e. g., oils, cinders, etc.

The present invention is further illustrated, but not limited, by the following examples:

*Example 1*

Spray testing of the present herbicidal compositions was conducted as follows:

Respective cyclohexanone solutions of the amines and hydrochlorides shown below, together with an emulsifying agent were added to water, the quantity of solution employed being calculated to give emulsions containing 1.0 per cent of the amine compound, based on the weight of the total emulsion. The quantity of emulsifying agent used was 0.2 per cent by weight, based on the weight of the total emulsion. Said emulsifying agent comprised a mixture of a polyalkyleneglycol derivative and an alkylbenzenesulfonate.

Three-week old corn and bean plants, respectively, were sprayed with the emulsions, two plants of each variety being employed. The spraying was continued until droplets formed on and/or fell from the foliage and stems of the sprayed plants, up to 15 ml. of the emulsion being applied to each plant. The sprayed plants as well as two untreated "blank" specimens of each plant were then allowed to remain under standard conditions of sunlight and watering for a period of one week. At the end of that time the sprayed plants were compared with the untreated plants in order to determine the extent of injury, if any. The following observations were made:

| Compound Tested | Extent of Injury | |
|---|---|---|
| | Bean | Corn |
| Bis(β-chloroethyl)isopropylamine. | Severe, leaves dried. | Plant dead, leaves dried. |
| β-Chloroethyldiethylamine | ___do___ | Severe, leaves dried. |
| Bis(β-chloroethyl)isopropylamine hydrochloride. | ___do___ | Plant dead, leaves dried. |
| β-Chloroethyldiethylamine hydrochloride. | Plant dead, leaves dried. | Moderate. |

While the present amine compounds are most advantageously employed as herbicides by incorporating them into an aqueous emulsion as herein described, they may also be employed in other plant destroying methods. Thus they may be incorporated into solid carriers such as clay, talc, pumice and bentonite to give herbicidal compositions which may be applied to living plants or to surfaces which are to be freed from plant growth. The compounds may also be mixed with liquid or solid agricultural pesticides, e. g., insecticides and fungicides. While solutions of the amines in organic solvents may be employed for preventing and destroying plant-growth, we have found that the emulsions possess an improved tendency to adhere to the treated surfaces and that less of the active ingredients, i. e., the amines or the hydrochlorides thereof is required to give comparable herbicidal efficiency.

This application is a continuation-in-part of my applications Serial No. 158,321, filed April 26, 1950, and Serial No. 220,130, filed April 9, 1951, both of which applications are now abandoned.

What I claim is:

1. A herbicidal composition comprising an oil-in-water emulsion of an amine compound selected from the class consisting of aliphatic amines having the general formula

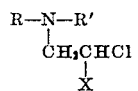

in which R and R' are members of the group consisting of alkyl radicals of from 1 to 8 carbon atoms, the radical —CH₂CH₂Cl and the radical CH₂CHClCH₃, and X is selected from the class consisting of hydrogen and the methyl radical, and hydrochlorides of said aliphatic amines, said amine compound being present in said composition in a quantity which is toxic to plant life.

2. A herbicidal composition comprising an oil-in-water emulsion of bis(β-chloroethyl)isopropylamine hydrochloride, said hydrochloride being present in said composition in a quantity which is toxic to plant life.

3. A herbicidal composition comprising an oil-in-water emulsion of β-chloroethyldiethylamine hydrochloride, said hydrochloride being present in said composition in a quantity which is toxic to plant life.

4. A herbicidal composition comprising an oil-in-water emulsion of β-chloroethyldiethylamine, said amine being present in said composition in a quantity which is toxic to plant life.

5. A herbicidal composition comprising an oil-in-water emulsion of bis(β-chloroethyl)isopropylamine, said amine being present in said composition in a quantity which is toxic to plant life.

6. The method for the general destruction of undesirable plants which comprises applying to said plants a toxic quantity of a herbicidal composition comprising bis(β-chloroethyl)isopropylamine hydrochloride.

7. The method for the general destruction of undesirable plants which comprises applying to said plants a toxic quantity of a herbicidal composition comprising β-chloroethyldiethylamine hydrochloride.

References Cited in the file of this patent

UNITED STATES PATENTS 2,072,348     Ward _____ Mar. 2, 1937